United States Patent
Dorsch et al.

(10) Patent No.: US 7,466,716 B2
(45) Date of Patent: Dec. 16, 2008

(54) REDUCING LATENCY IN A CHANNEL ADAPTER BY ACCELERATED I/O CONTROL BLOCK PROCESSING

(75) Inventors: Rainer Dorsch, Herrenberg (DE); Martin Eckert, Jettingen (DE); Markus Helms, Boeblingen (DE); Walter Lipponer, Ammerbuch (DE); Thomas Schlipf, Holzgerlingen (DE); Daniel Sentler, Magstadt (DE); Harmut Ulland, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 11/179,909

(22) Filed: Jul. 11, 2005

(65) Prior Publication Data
US 2006/0029088 A1     Feb. 9, 2006

(30) Foreign Application Priority Data
Jul. 13, 2004     (EP) .................................. 04103346

(51) Int. Cl.
*H04L 12/28* (2006.01)
(52) U.S. Cl. .......................... 370/412; 370/419; 710/52
(58) Field of Classification Search ........................ None
See application file for complete search history.

(56) References Cited

U.S. PATENT DOCUMENTS

| | | | |
|---|---|---|---|
| 7,116,673 B2 * | 10/2006 | Kashyap et al. ............. 370/412 |
| 7,212,547 B2 * | 5/2007 | Carnevale et al. ........... 370/469 |
| 7,218,640 B2 * | 5/2007 | Lebizay et al. .............. 370/429 |
| 7,266,083 B2 * | 9/2007 | Carnevale et al. ........... 370/242 |
| 2002/0141424 A1 * | 10/2002 | Gasbarro et al. ............ 370/412 |
| 2002/0184446 A1 * | 12/2002 | Kagan et al. ................ 711/130 |
| 2003/0043805 A1 * | 3/2003 | Graham et al. .............. 370/392 |
| 2003/0065856 A1 * | 4/2003 | Kagan et al. ................ 710/263 |
| 2004/0215848 A1 * | 10/2004 | Craddock et al. ............. 710/39 |

OTHER PUBLICATIONS

InfiniBand Architecture Specification vol. 1, Rel. 1.1, Nov. 6, 2002, pp. 1-131; 140-153; 415-491; 492-925.
InfiniBank Trade Association: About InfiniBand Trade Association, pp. 1-5 http://www.infinibandta.org/ibta/2005.

* cited by examiner

*Primary Examiner*—Bob A Phunkulh
(74) *Attorney, Agent, or Firm*—John E. Campbell

(57) ABSTRACT

The present invention generally relates to digital network communication, and in particular to processing data according to the InfiniBand™ (IB) Protocol with reduced latency and chip costs in an InfiniBand™ type computer system. ID information in a packet header is obtained before the body of the packet has completely arrived at a receiving Channel adapter. The ID information is used to obtain work Queue Pair Context (QPC) and when needed an associated Work Queue Element (WQE), for operating on the data content of the packet being received.

21 Claims, 7 Drawing Sheets

REDUCING LATENCY IN A CHANNEL ADAPTER BY ACCELERATED I/O CONTROL BLOCK PROCESSING

TECHNICAL FIELD

The present invention generally relates to digital network communication, and in particular to processing data in a queue or queue-pair-based and context-based communication with reduced latency and chip costs, preferably it relates to improvements to the InfiniBand™ (IB) Protocol and InfiniBand™ type computer systems.

BACKGROUND OF THE INVENTION

In the field of enterprise computer networks, e.g. as sketched in FIG. 1A by an enterprise's intranet 10, today's computer industry is moving toward fast, packetized, serial input/output (I/O) bus architectures, in which computing hosts like the exemplary database server 12 and peripherals like an Internet mail server 14 are linked by a switching network, commonly referred to as a switching fabric. A number of architectures of this type have been proposed, culminating in the "InfiniBand™" (IB) architecture, which has been advanced by a consortium led by a group of industry leaders. The IB architecture is described in detail in the InfiniBand™ Architecture Specification, which is available from the InfiniBand™-Trade Association at www.infinibandta.org and is incorporated herein by reference.

InfiniBand™ technology connects the hardware of two channel adapters 16, further abbreviated herein as CA, by using Queue Pairs further abbreviated herein as QPs. Those QPs have associated with them a Send Queue and a Receive Queue. The QPs are set up by software. So each application can have multiple QPs for different purposes. Each QP has associated with it a Queue Pair Context further abbreviated herein as QPC, which contains information about the type of the QP, e.g. whether it concerns a reliable or an unreliable connection.

If an application wants to use a QP, it has to send a Work Request, further abbreviated herein as WR, to the Channel Adapter (CA). A work request gets translated into an InfiniBand™-defined Work Queue Element further abbreviated herein as WQE, and is made available on the send or receive queue of the QP. The list of WQEs, which belong to a given QP, is stored in the QPC. This is true not only for the send side, but for the receive side as well, except in cases of Remote Direct memory Access (RDMA). The WQEs contain information, where to store received data, in the system memory of the receiving side computer.

FIG. 1B shows a block diagram illustrating a physical overview of a system, which contains an InfiniBand™ Channel Adapter 16.

The system consists of one or more processors 15 and a system memory 18. Within the memory there is section 11 containing outstanding Work Requests and a data section 13, which is organized divided into several Data Segments.

The processor(s) and the memory 18 are connected to a System Interconnect Structure 19. This System Interconnect is implemented in form of an adequate bus structure and has connection to the CA 16.

Within the CA 16 there are one ore more Packet Receive Processor(s) 17 PRP, which are connected to the physical port 9 of the CA 16. The task of the Packet Receive Processors 17 (PRPs) is to analyze incoming packets and store them into the system memory.

FIG. 2 is to give a short overview over the internal structure and the basic functionality of the receive side of a prior art Channel Adapter 16.

A new packet comes in over the physical link 20. According to the InfiniBand™ Specification the link can have work on different speeds.

First the packet is stored in Virtual Lane In Manager (VLInMager) 22. This unit is needed to reduce backpressure to the link. It may be basically assumed to be a large data array.

Over a predetermined dispatch algorithm the packets are transmitted to the PRPs 17. They analyze the packet and fetch some data over a dedicated logic, referred herein as Queue Pair Context Manager (QPCM) 24.

To handle the packet correctly, some data has to be fetched over the System Interconnect Logic 19.

With reference to FIGS. 3, 4 and 5 the data structures as used in prior art are briefly described in order to give a full understanding to the skilled reader.

FIG. 3 shows an InfiniBand™ packet. It consists of an Header 30 followed by Data 32. At the end of a packet there is an CRC section 34.

FIG. 4 shows a QP Context. It contains a lot of context data 40 concerning the QP, e.g., telling if the connection type is reliable or unreliable. Additionally, it contains pointers 42 A,B, . . . to the multiple Work Queue Elements (WQEs), which belong to that QP.

FIG. 5 shows a high level overview of a prior art WQE 50. It contains some quantity of Meta data 52 concerning the Work Request. Additionally there are pointers 54A, 54B, 54C to specific Data Sections in the system memory.

These structures are described in detail in the InfiniBand™ Specification.

With reference to FIG. 6 further details of the prior art data flow are described. After a packet has arrived it is stored in a data array 60, which belongs to before-mentioned VLIn Manager 22. With a given dispatch algorithm a packet 62 is presented to a PRP 17.

The PRP requests from the QPCM 24 the QPC of the QP Number denoted as QP#, which belongs to and identifies the packet. If the context is in a cache 64 of the QPCM 24, it is presented immediately to the PRP, see arrow 66. Else it is requested and fetched, see arrows 68, from memory using the System Interconnect 19.

After the PRP has received the context, it fetches (requests and receives) the WQE 50 from memory using the System Interconnect, see arrows 69.

Approaching now the problem underlying the present invention, the sum of all WQE and QPCs, which belong to a given CA 16, can be too big to be stored on the CA itself. So, a well known solution is to store the WQE and QPCs in the System Memory 18 and fetch them from the memory via any system interconnect means 19, ie, the before-mentioned bus system, when needed. A prior art improvement of that basic approach is to use caches located on the CA.

The initial problem of "outsourcing" the WQEs and QPCs to the systems memory 18 into a work request (WR) queue 11 consists in the fact, that it needs considerable time to fetch them from there to the channel adapter's chip.

After a packet arrives at its chip the CA has to find out to which QP that packet belongs by analyzing the header.

Then the CA has to fetch the QPC from the system memory. After analyzing the QPC the CA can start fetching the right WQE.

During that time the packet disadvantageously remains unused in the chip and occupies computing resources, as e.g. processor 15 and memory 18.

Thus, this prior art outsourcing of WQEs and QPCs to the system memory disadvantageously costs a lot of performance.

In order to reduce that impact one can implement more packet receive processors 17 (PRPs), which are working on the packets. Working on more packets in parallel reduces the loss of performance.

But this requires increasing the chip size of the channel adapter, which would make the chip disadvantageously more expensive.

A straight-forward solution to that would be the use of caches. That means that a certain amount of QPCs and WQEs could be stored in the chip cache and thus on-chip. Once the CA would have fetched a QPC or WQE it would stay in the CA, because it is most likely that there would be more packets in a row for the same QP. So this information could be reused.

Since, however, the cache size is not infinite, QPCs and WQEs would have to be deleted from the cache to be able to store new QPCs and WQEs which would be needed. That means that the original problem to fetch the data out of the system memory 18 is not really solved, but instead it is just reduced. Further, generally, cache size is not for free. It costs a lot of chip size, which makes the chip disadvantageously much more expensive.

SUMMARY OF THE INVENTION

This objective of the invention is achieved by the features stated in enclosed independent claims. Further advantageous arrangements and embodiments of the invention are set forth in the respective subclaims. Reference should now be made to the appended claims.

In simple words, the inventional approach comprises basically to look at the header of a packet, while it arrives, and to immediately evaluate the header information. Since it needs a certain amount of time until the whole packet is arrived, that time may advantageously be used for an immediate Queue evaluation or QPC evaluation, in order to know earlier the respective next work request in case of RDMA or WQE in case of non-RDMA processing, which includes an accelerated processing of the respective control blocks, which contain the information, where the Queue or Queue Pair context is stored, and thus allows early knowledge of the Work Queue Element (WQE) underlying the incoming data packet.

The present invention is basically applicable for context-based and queue-based or queue-pair-based communication. It is in particular applicable for communication according to the InfiniBand™ protocol and for both, RDMA communication and for non-RDMA communication using WQEs. For RDMA communication there is no WQE needed on the receive side, and a fetching thereof from the memory can be skipped.

According to the present invention the time in which the packet is sent over the link, is usefully exploited to fetch the QPC and begin the evaluation thereof. This reduces the time the packet has to wait in the PRP 17, see FIG. 1B. Hence less PRPs 17 need to be instantiated, which makes the chip cheaper.

Additionally, a smaller cache may be used as the inventional solution is very well adjusted to the WQE problem, because most of the WQEs are used just for one packet.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

BEST MODE FOR CARRYING OUT THE INVENTION

The following description of a preferred inventional embodiment is given to enable a person of ordinary skill in the art to use the invention. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 7:
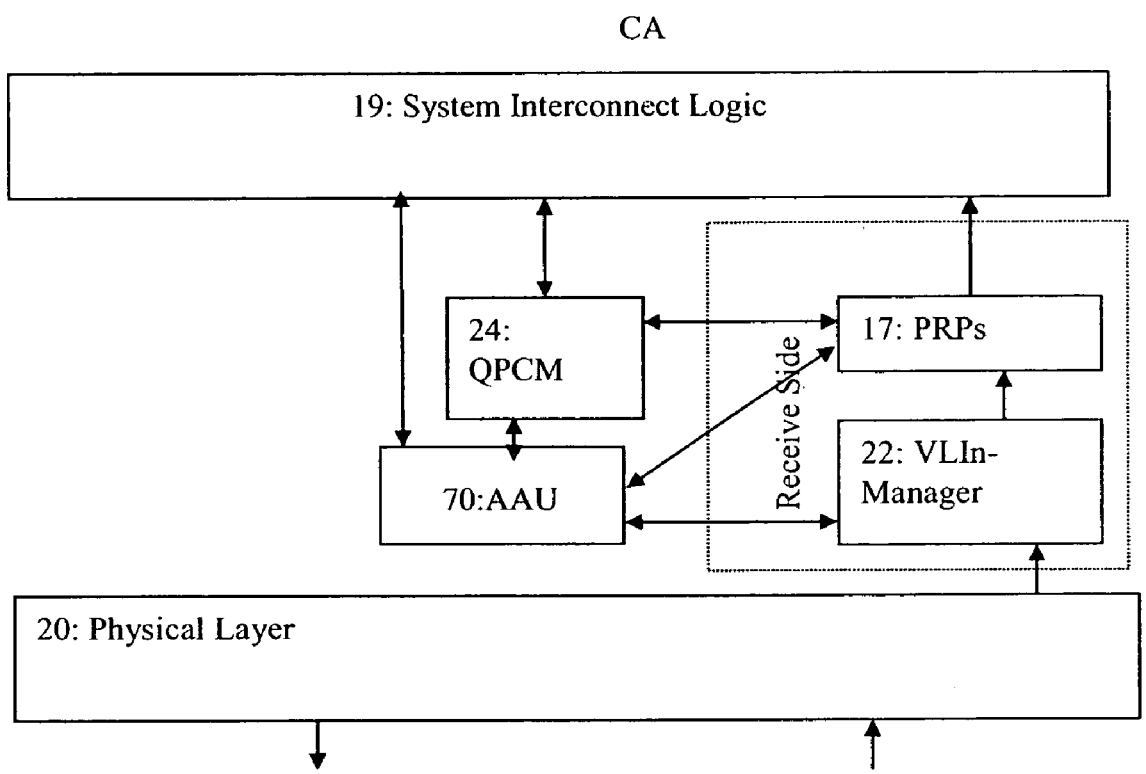
FIG. 7 is a representation according to FIG. 2 amended according to the invention.

According to the inventional embodiment shown in FIG. 7 an inventional WQE Access Acceleration Unit (AAU) 70 is provided in the Channel Adapter 16. Said AAU unit 70 basically comprises the logic, required to the description given below, and a cache area 72, where QP IDs and pointer to the respective context are stored. It is further provided with hardware connections to all units of the receive side, as well as to the Queue Pair Context Manager 24, abbreviated herein as QPCM, and to the system Interconnect Logic.

Figure 8:
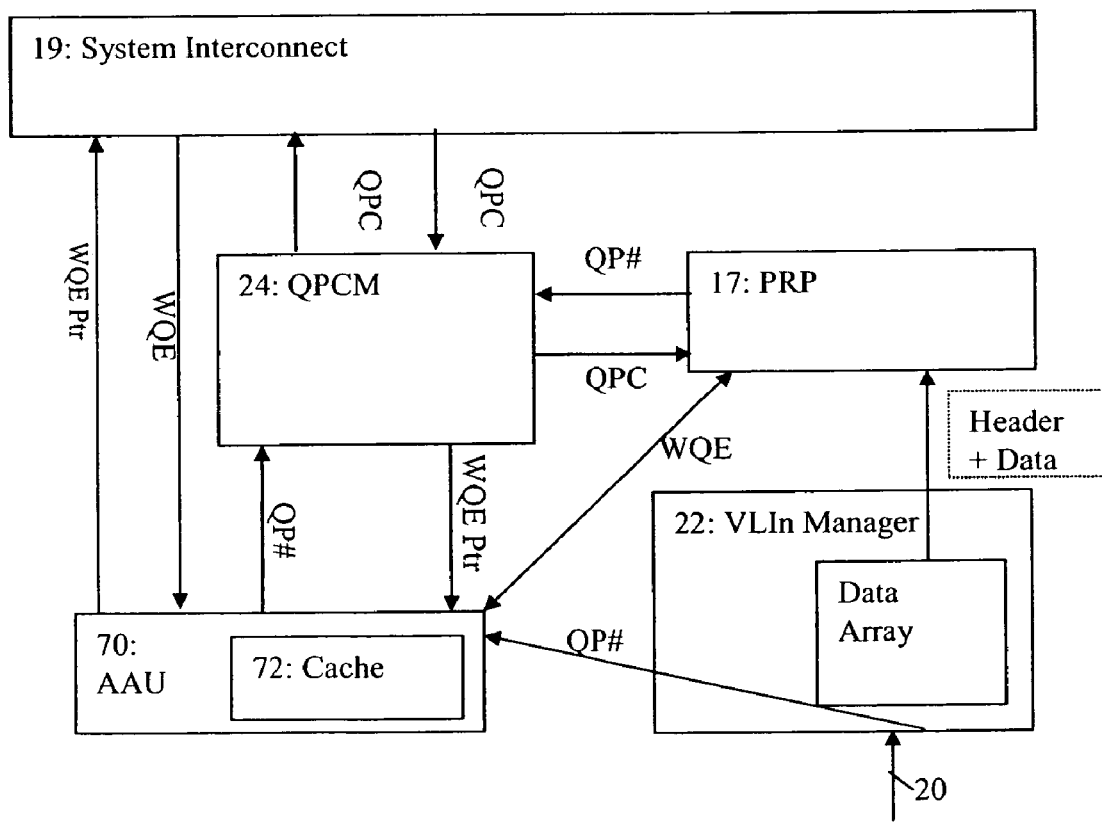
FIG. 8 is a representation according to FIG. 6 amended according to the invention.
Figure 9:
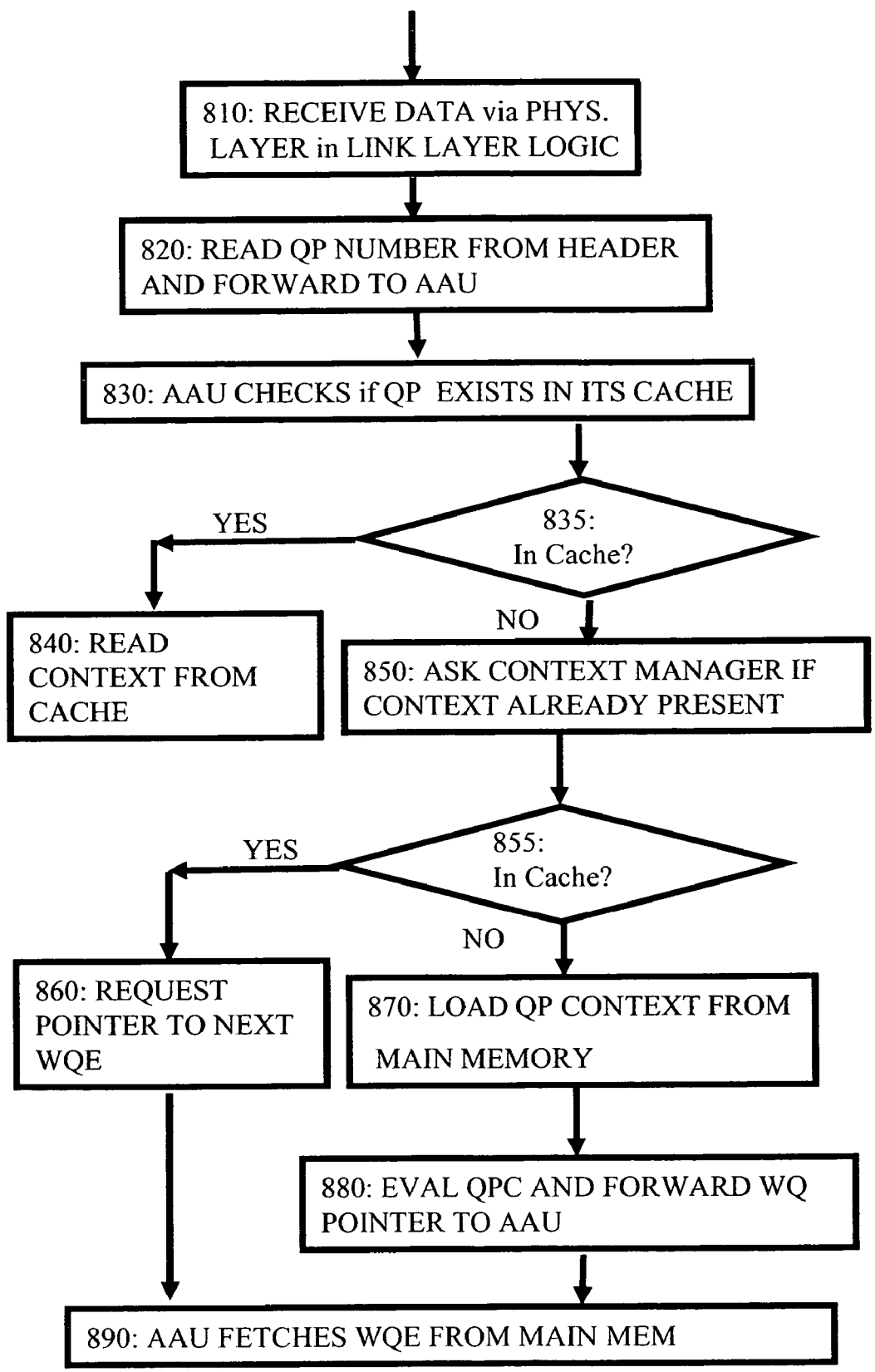
FIG. 9 shows a control flow block diagram with the most relevant steps forming part of the inventional procedure in a preferred embodiment.

FIGS. 8 and 9 describe the structure and data flow according to this inventional embodiment in more detail, as follows.

While the packet is transferred over the physical link 20, the Queue Pair number (QP#), ie its ID, which is part of the packet header and thus is available quite early, as soon as it is received, step 810, is presented to the AAU 70. Said AAU 70 forwards, step 820, the QP# to the QPCM 24.

The AAU 70 checks now in a step 830 and 835, if this context QPC is residing in its own cache 72. If residing in AAU cache 72, the QPC is read from there, step 840, else the respective QPC will be requested from the QPCM 24, step 850, if it is residing in its cache 64, step 855.

If yes, it will be available to the AAU 70 to request the respective WQE from main memory 18, step 860, otherwise the QPC is fetched and loaded from System memory 18, step 870.

After having evaluated the Queue Pair context, the QPCM 24 presents the next WQE Pointer from the context to said AAU 70, step 880.

Figure 1A:
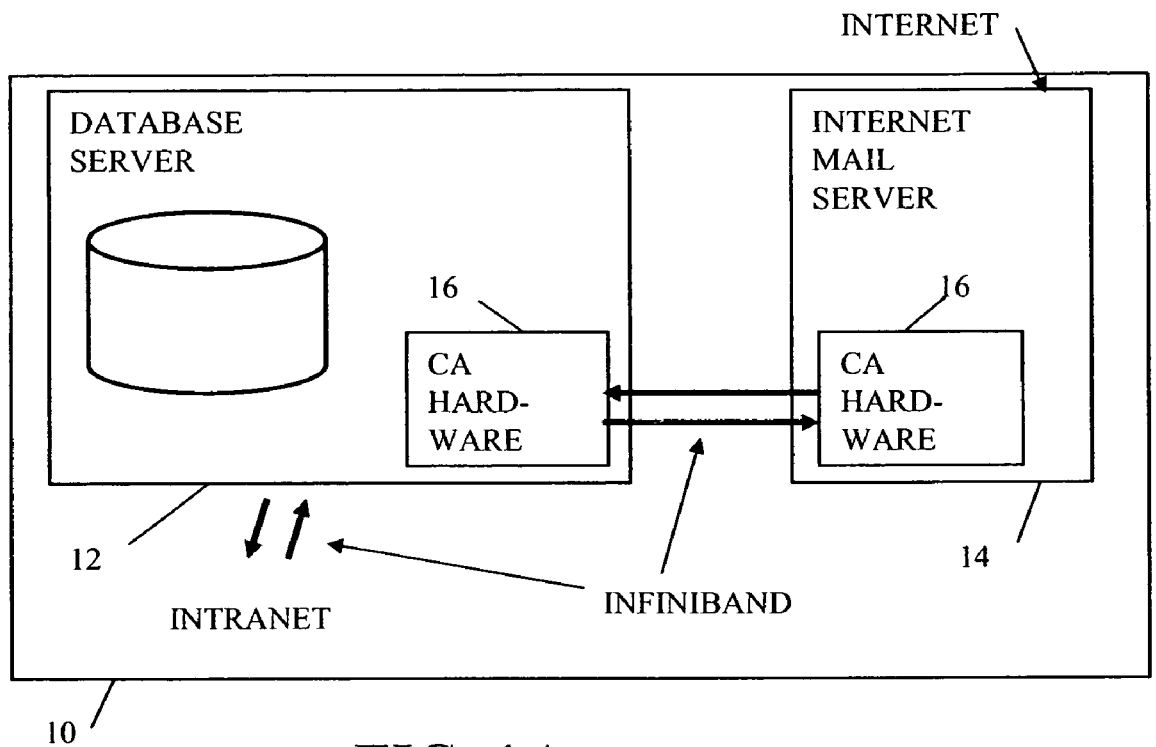
FIG. 1A shows a block diagram illustrating the system overview for applying InfiniBand™ technology.
Figure 1B:
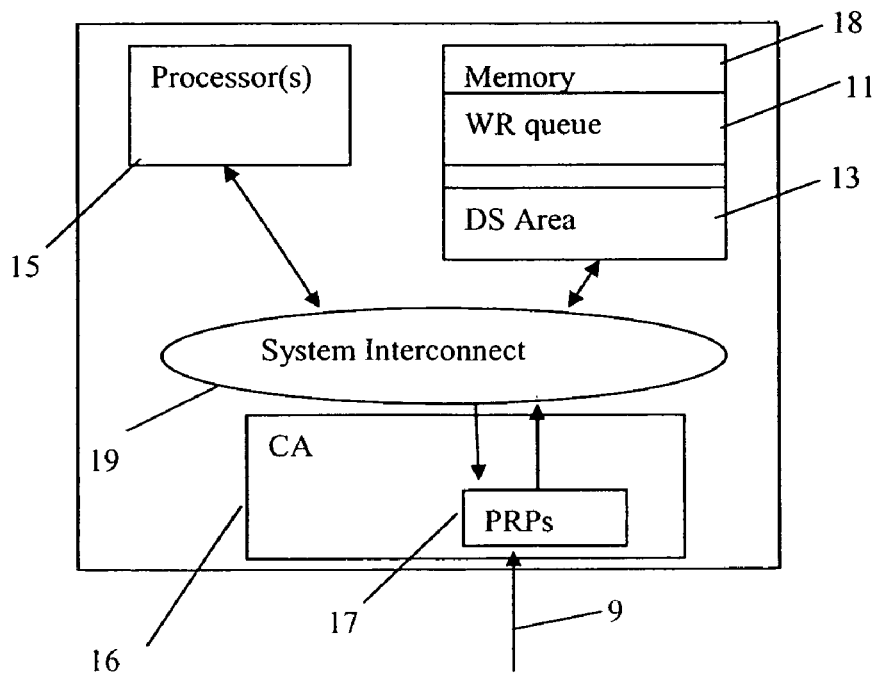
FIG. 1B shows a physical overview of a prior art system, which includes an InfiniBand™ Channel Adapter (CA)
Figure 2:
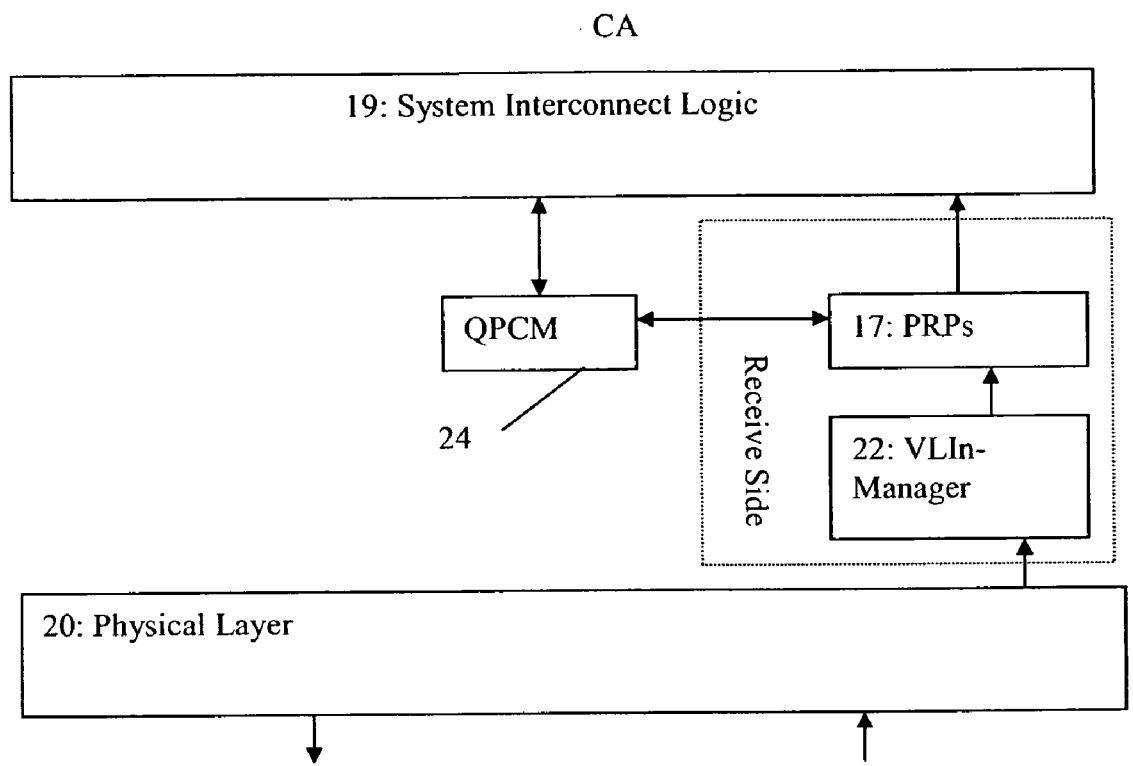
FIG. 2 shows a block diagram illustrating the logical overview of a prior art CA which uses state of the art methods.
Figure 3:
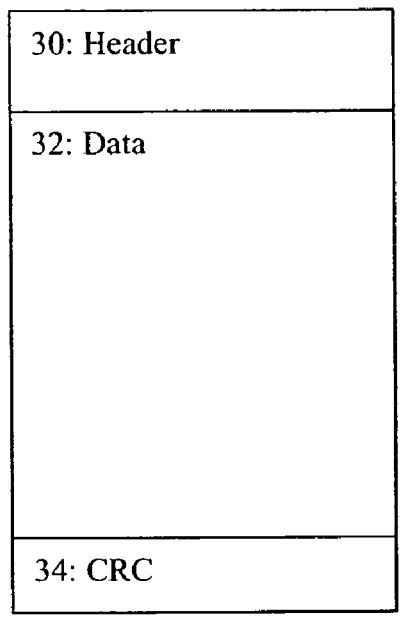
FIG. 3 shows a scheme of a prior art IB Packet.
Figure 4:
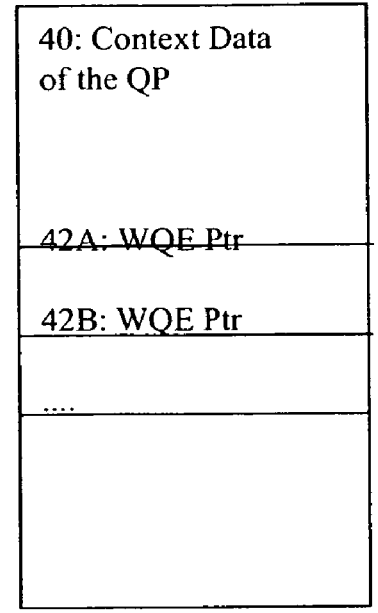
FIG. 4 shows a scheme of a prior art Queue Pair Context.
Figure 5:
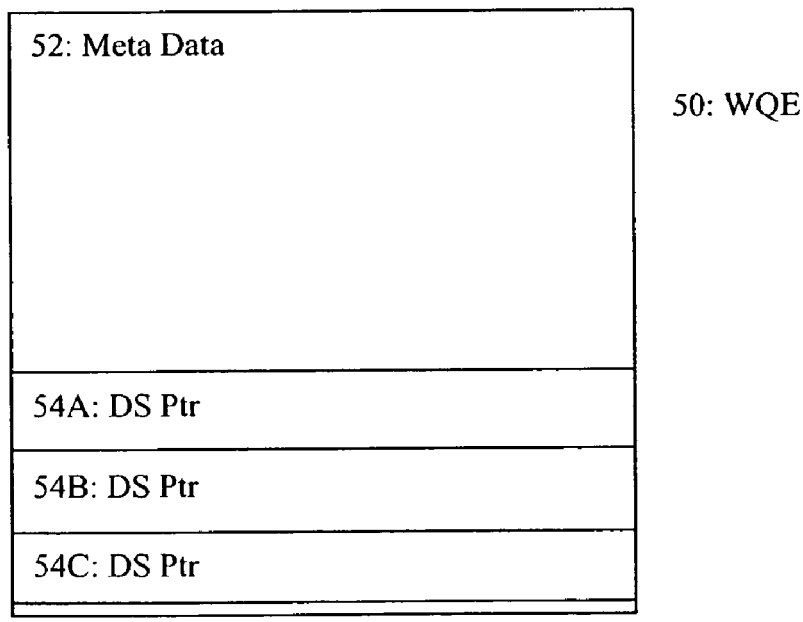
FIG. 5 shows a scheme of a prior art Work Queue Element.
Figure 6:
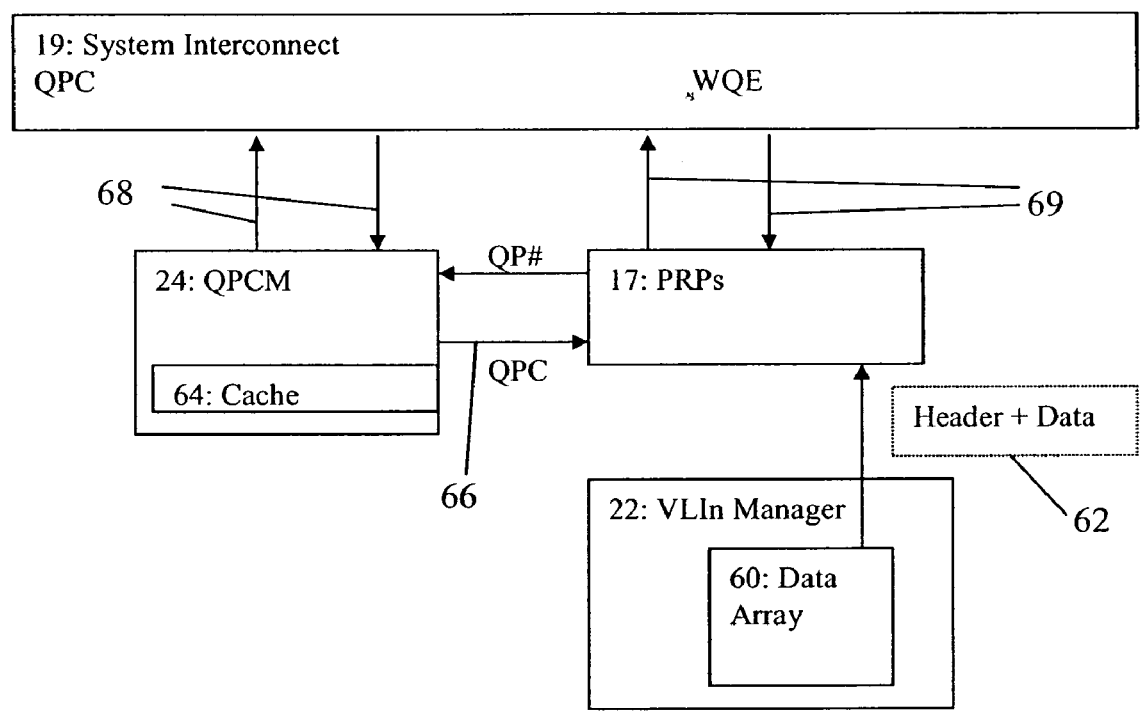
FIG. 6 shows a block diagram of the receive side of a prior art CA including an illustration of the information flow.

The PRP 17 works as described in FIG. 6, besides of it requests the WQE from the AAU 70.

The advantage is, that the probability that the QPC or the WQE is already in the Channel Adapter chip's cache, is higher.

The present invention can be realized in hardware, software, or a combination of hardware and software. It can be implemented in multiple types of I/O adaptor devices, in controller devices, bridges, hubs, etc. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:
 a) conversion to another language, code or notation;
 b) reproduction in a different material form.

What is claimed is:

1. A method for Channel adapter communications in a Channel adapter having one or more work Queue Pairs, each work Queue Pair having a corresponding Queue Pair Context, a work Queue Pair comprising a send queue and a receive queue, the method comprising the steps of:
 receiving a first data packet at the Channel adapter, the first data packet comprising a first header field followed by a first data field, the first header field comprising a first queue ID;
 when the first queue ID of the first header field has been received, and before the first data field has been completely received, initiating a process for obtaining a first Queue Pair context associated with the received first queue ID, the process comprising the steps of:
 when the first Queue Pair context is determined to be in the local cache of the Channel adapter, loading the first Queue Pair context from the local cache;
 when the first Queue Pair context is determined not to be in the local cache, loading the first Queue Pair context from a main memory; and
 based on information in the loaded first Queue Pair context, performing work on the first data field received.

2. The method according to claim 1 comprising the further steps of:
 when the first queue ID of the first header field has been received, and before the first data field has been completely received, initiating a process for obtaining a Work Queue Element from a first receive queue of the first Queue Pair, the process comprising the steps of:
 based on information in the first Queue Pair context, determining a main memory location of a first Work Queue Element;
 when the first Work Queue Element is determined to be in the local cache of the Channel adapter, loading the first Work Queue Element from the local cache;
 when the first Work Queue Element is determined not to be in the local cache, loading the first Work Queue Element from the main memory; and
 based on information in the loaded Work Queue Element, performing work on the first data field received.

3. The method according to claim 1 comprising the further step of when the first Queue Pair context is loaded from the main memory, storing the loaded first Queue Pair context into the local cache.

4. The method according to claim 2 comprising the further step of when the first Work Queue Element is loaded from the main memory, storing the loaded first Work Queue Element into the local cache.

5. The method according to claim 1 wherein the Channel adapter comprises an InfiniBand™ protocol wherein the performing work on the first data field received step comprises the further step of storing the first data field received in the main memory.

6. The method according to claim 1 wherein the Queue Pair context comprise pointers to one or more Work Queue elements of the corresponding Queue Pairs.

7. The method according to claim 2 wherein the first Work queue element comprises metadata and main memory pointers associated the work to be performed on the first data field received.

8. The method according to claim 1 wherein the first data field further comprises a CRC field.

9. A system for Channel adapter communications in a Channel adapter having one or more work Queue Pairs, each work Queue Pair having a corresponding Queue Pair Context, a work Queue Pair comprising a send queue and a receive queue, the system comprising:
 a network;
 a Channel adapter in communication with the network wherein the Channel adapter includes instructions to execute a method comprising the steps of:
 receiving a first data packet at the Channel adapter, the first data packet comprising a first header field followed by a first data field, the first header field comprising a first queue ID;
 when the first queue ID of the first header field has been received, and before the first data field has been completely received, initiating a process for obtaining a first Queue Pair context associated with the received first queue ID, the process comprising the steps of:
 when the first Queue Pair context is determined to be in the local cache of the Channel adapter, loading the first Queue Pair context from the local cache;
 when the first Queue Pair context is determined not to be in the local cache, loading the first Queue Pair context from a main memory; and
 based on information in the loaded first Queue Pair context, performing work on the first data field received.

10. The system according to claim 9 comprising the further steps of:
 when the first queue ID of the first header field has been received, and before the first data field has been completely received, initiating a process for obtaining a Work Queue Element from a first receive queue of the first Queue Pair, the process comprising the steps of:
 based on information in the first Queue Pair context, determining a main memory location of a first Work Queue Element;
 when the first Work Queue Element is determined to be in the local cache of the Channel adapter, loading the first Work Queue Element from the local cache;

when the first Work Queue Element is determined not to be in the local cache, loading the first Work Queue Element from the main memory; and based on information in the loaded Work Queue Element, performing work on the first data field received.

11. The system according to claim 9 comprising the further step of when the first Queue Pair context is loaded from the main memory, storing the loaded first Queue Pair context into the local cache.

12. The system according to claim 10 comprising the further step of when the first Work Queue Element is loaded from the main memory, storing the loaded first Work Queue Element into the local cache.

13. The system according to claim 9 wherein the Channel adapter comprises an InfiniBand™ protocol wherein the performing work on the first data field received step comprises the further step of storing the first data field received in the main memory.

14. The system according to claim 9 wherein the Queue Pair context comprise pointers to one or more Work Queue elements of the corresponding Queue Pairs.

15. The system according to claim 10 wherein the first Work queue element comprises metadata and main memory pointers associated the work to be performed on the first data field received.

16. The system according to claim 9 wherein the first data field further comprises a CRC field.

17. A computer program product for Channel adapter communications in a Channel adapter having one or more work Queue Pairs, each work Queue Pair having a corresponding Queue Pair Context, a work Queue Pair comprising a send queue and a receive queue, the computer program product comprising:

a storage medium readable by a processing circuit and storing instructions for execution by a processing circuit for performing a method comprising the steps of:

receiving a first data packet at the Channel adapter, the first data packet comprising a first header field followed by a first data field, the first header field comprising a first queue ID;

when the first queue ID of the first header field has been received, and before the first data field has been completely received, initiating a process for obtaining a first Queue Pair context associated with the received first queue ID, the process comprising the steps of:

when the first Queue Pair context is determined to be in the local cache of the Channel adapter, loading the first Queue Pair context from the local cache;

when the first Queue Pair context is determined not to be in the local cache, loading the first Queue Pair context from a main memory; and based on information in the loaded first Queue Pair context, performing work on the first data field received.

18. The computer program product according to claim 17 comprising the further steps of:

when the first queue ID of the first header field has been received, and before the first data field has been completely received, initiating a process for obtaining a Work Queue Element from a first receive queue of the first Queue Pair, the process comprising the steps of:

based on information in the first Queue Pair context, determining a main memory location of a first Work Queue Element;

when the first Work Queue Element is determined to be in the local cache of the Channel adapter, loading the first Work Queue Element from the local cache;

when the first Work Queue Element is determined not to be in the local cache, loading the first Work Queue Element from the main memory; and based on information in the loaded Work Queue Element, performing work on the first data field received.

19. The computer program product according to claim 17 comprising the further step of when the first Queue Pair context is loaded from the main memory, storing the loaded first Queue Pair context into the local cache.

20. The computer program product according to claim 18 comprising the further step of when the first Work Queue Element is loaded from the main memory, storing the loaded first Work Queue Element into the local cache.

21. The computer program product according to claim 17 wherein the Channel adapter comprises an InfiniBand™ protocol wherein the performing work on the first data field received step comprises the further step of storing the first data field received in the main memory.

* * * * *